(12) United States Patent
Hudson

(10) Patent No.: US 11,440,111 B2
(45) Date of Patent: Sep. 13, 2022

(54) METHOD OF USING A BLADE CONFIGURED TO REDUCE RESIDUAL FOAM DUST

(71) Applicant: BMIC LLC, Dallas, TX (US)

(72) Inventor: Breck Hudson, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 16/995,096

(22) Filed: Aug. 17, 2020

(65) Prior Publication Data

US 2022/0048124 A1 Feb. 17, 2022

(51) Int. Cl.
*B23D 61/12* (2006.01)
*B23D 49/10* (2006.01)

(52) U.S. Cl.
CPC .......... *B23D 61/121* (2013.01); *B23D 49/10* (2013.01)

(58) Field of Classification Search
CPC .... B23D 61/12; B23D 61/121; B23D 61/123; B23D 61/126; B23D 65/00; B23D 65/02; B23D 65/04; B23D 49/10
USPC ....... 83/835–855; D15/134; 30/380
See application file for complete search history.

(56) References Cited

U.S. PATENT DOCUMENTS

| | | | |
|---|---|---|---|
| 245,090 A * | 8/1881 | Northway | B23D 61/121 83/848 |
| 305,206 A * | 9/1884 | Lowe | B23D 61/121 83/849 |
| 388,820 A * | 9/1888 | Bundy | B23D 61/121 83/850 |
| 434,352 A * | 8/1890 | Miller | B23D 61/121 83/848 |
| 452,391 A * | 5/1891 | Rothgery | B23D 61/121 83/848 |
| 566,865 A * | 9/1896 | Morrish | B23D 61/121 83/846 |
| 810,530 A * | 1/1906 | Guedel | B23D 61/121 83/848 |
| 869,182 A * | 10/1907 | Hotchkiss | B23D 61/121 83/848 |
| 1,336,209 A * | 4/1920 | Driver | B23D 61/121 83/852 |
| 1,402,427 A * | 1/1922 | McKenney | B23D 61/121 83/849 |
| 1,716,976 A * | 6/1929 | Prentice | B23D 61/121 83/850 |
| 1,837,344 A * | 12/1931 | Stauder | B23D 61/04 83/855 |
| 2,718,245 A * | 9/1955 | Owen et al. | B23D 61/121 83/848 |
| 2,741,279 A * | 4/1956 | Stratton | B23D 61/121 83/850 |

(Continued)

OTHER PUBLICATIONS

"CenterFire Dust-Free Foam Blade", Marshalltown USA.

*Primary Examiner* — Jason Daniel Prone
(74) *Attorney, Agent, or Firm* — Greenberg Traurig, LLP

(57) ABSTRACT

Some embodiments of the present disclosure relate to a blade. In some embodiments, the blade is configured to produce 50% to 99.9% less residual dust than a comparative blade when the blade is used to cut at least one foam board, where the comparative blade is identical to the blade, except that the comparative blade does not comprise any notches. Methods of using and making the blade and systems that include the blade are also described.

10 Claims, 4 Drawing Sheets

(56) References Cited

U.S. PATENT DOCUMENTS

| | | | | |
|---|---|---|---|---|
| 2,787,299 | A | * | 4/1957 | Anderson ............ B23D 61/123 83/661 |
| 3,213,910 | A | * | 10/1965 | Sweet ................ B23D 61/123 83/661 |
| 3,262,475 | A | * | 7/1966 | Sweet ................ B23D 61/123 83/168 |
| 4,027,390 | A | * | 6/1977 | Kendzior ............ B23D 61/12 83/835 |
| 4,031,789 | A | * | 6/1977 | Soodalter ............ B26D 3/22 83/835 |
| 4,189,968 | A | * | 2/1980 | Miranti, Jr. ......... B23D 61/126 83/820 |
| 4,461,198 | A | * | 7/1984 | Grassmann .......... B23D 61/02 83/835 |
| 4,587,876 | A | * | 5/1986 | Erhardt .............. B23D 61/14 83/835 |
| 4,688,458 | A | * | 8/1987 | Krilov ............... B23D 61/12 83/835 |
| 4,727,788 | A | * | 3/1988 | Yoshida ............. B23D 61/121 83/848 |
| 4,827,822 | A | * | 5/1989 | Yoshida ............. B23D 61/121 83/835 |
| 5,054,354 | A | * | 10/1991 | Kubis ................ B23D 61/06 83/835 |
| 5,524,518 | A | * | 6/1996 | Sundstrom .......... B23D 61/025 83/835 |
| 5,758,561 | A | * | 6/1998 | Curtsinger .......... B23D 65/00 83/835 |
| 5,896,800 | A | * | 4/1999 | Curtsinger .......... B23D 65/00 83/835 |
| 5,943,775 | A | * | 8/1999 | Lanahan ............. B26D 1/553 83/171 |
| 6,601,495 | B2 | * | 8/2003 | Cranna .............. B23D 61/121 83/661 |
| 6,679,145 | B1 | * | 1/2004 | Lee .................. B23D 59/006 83/788 |
| 6,701,816 | B2 | * | 3/2004 | Smith ............... B23D 59/001 83/789 |
| 7,036,415 | B2 | * | 5/2006 | Tsujimoto ........... B23D 61/121 83/661 |
| 7,117,863 | B1 | * | 10/2006 | Dassoulas ........... B23D 65/00 125/13.01 |
| 7,168,216 | B2 | * | 1/2007 | Hagen, Jr. ........... B29C 44/186 52/404.3 |
| 7,178,441 | B2 | * | 2/2007 | Hellbergh ........... B23D 61/121 83/835 |
| 7,451,677 | B2 | * | 11/2008 | Souza ............... B23D 61/12 83/835 |
| 7,451,678 | B2 | | 11/2008 | Dion et al. |
| 8,051,756 | B2 | * | 11/2011 | Hashimoto .......... B23D 61/123 83/848 |
| 8,113,100 | B1 | * | 2/2012 | Cranna ............. B23D 61/121 83/851 |
| 8,347,873 | B2 | * | 1/2013 | Baratta .............. B23D 65/00 83/676 |
| 8,689,667 | B2 | * | 4/2014 | Butzen .............. B23D 61/121 83/835 |
| D744,794 | S | * | 12/2015 | Elliston ............. B23D 61/126 D8/20 |
| 9,370,834 | B2 | * | 6/2016 | Elliston ............. B23D 61/121 |
| 9,751,134 | B2 | * | 9/2017 | Thom ............... B23B 51/0406 |
| 10,118,238 | B2 | * | 11/2018 | Kazda ............... B23D 61/123 |
| 10,537,951 | B2 | * | 1/2020 | Hunter .............. B23D 61/123 |
| 10,625,353 | B2 | * | 4/2020 | Vogel ............... B23D 61/121 |
| 2004/0118263 | A1 | * | 6/2004 | Hellbergh ........... B23D 61/121 83/846 |
| 2004/0255740 | A1 | * | 12/2004 | Troyer .............. B23D 61/121 83/13 |
| 2006/0130341 | A1 | * | 6/2006 | Burry ............... B23D 61/121 30/355 |
| 2006/0130631 | A1 | * | 6/2006 | Hesselberg ......... B23D 61/121 83/835 |
| 2012/0230788 | A1 | * | 9/2012 | Bozic ............... B23D 61/121 408/209 |
| 2014/0020531 | A1 | * | 1/2014 | Tsujimoto ........... B23D 61/121 83/13 |
| 2015/0367433 | A1 | * | 12/2015 | Knebel ............. B23D 61/021 83/835 |
| 2020/0180054 | A1 | * | 6/2020 | Sanogo ............. B23D 61/121 |
| 2020/0246888 | A1 | * | 8/2020 | Vogel ............... B23D 61/121 |
| 2020/0276662 | A1 | * | 9/2020 | Butzen .............. B23D 61/121 |
| 2021/0001422 | A1 | * | 1/2021 | Trautner ............ B23D 65/00 |

* cited by examiner

METHOD OF USING A BLADE CONFIGURED TO REDUCE RESIDUAL FOAM DUST

FIELD

Some embodiments of the present disclosure relate to a blade, a method of manufacturing the same, a method of using the same, and a system including the same.

BACKGROUND

Blades may be used to cut foam, such as but not limited to foam materials used in residential or commercial insulation. However, using blades to cut foam materials may produce excessive amounts of residual dust. Improved mechanisms for cutting foam are needed.

SUMMARY

Some embodiments of the present disclosure relate to a blade. In some embodiments, the blade comprises a cutting edge. In some embodiments, the cutting edge comprises a plurality of teeth. In some embodiments, each of the plurality of teeth extends in a first direction from the cutting edge. In some embodiments, the blade comprises a plurality of notches. In some embodiments, each of the plurality of notches is recessed in a second direction from the cutting edge. In some embodiments, the second direction is opposite the first direction. In some embodiments, the blade is configured to produce 50% to 99.9% less residual dust than a comparative blade when the blade is used to cut at least one foam board, where the comparative blade is identical to the blade, except that the comparative blade does not comprise any notches.

Some embodiments of the present disclosure relate to a method of using a blade. In some embodiments, the method comprises obtaining at least one foam board, and cutting the at least one foam board with the cutting edge of the blade described herein.

Some embodiments of the present disclosure relate to a method of manufacturing the blade described herein. In some embodiments, the method comprises obtaining a comparative blade. In some embodiments, the comparative blade is identical to the blade except that the comparative blade does not comprise any notches. In some embodiments, manufacturing the blade comprises forming the blade from the comparative blade. In some embodiments, forming the blade from the comparative blade comprises forming the plurality of notches, described herein, on a cutting edge of the comparative blade.

Some embodiments of the present disclosure relate to system comprising at least one foam board and the blade described herein.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DRAWINGS

Figure 4:
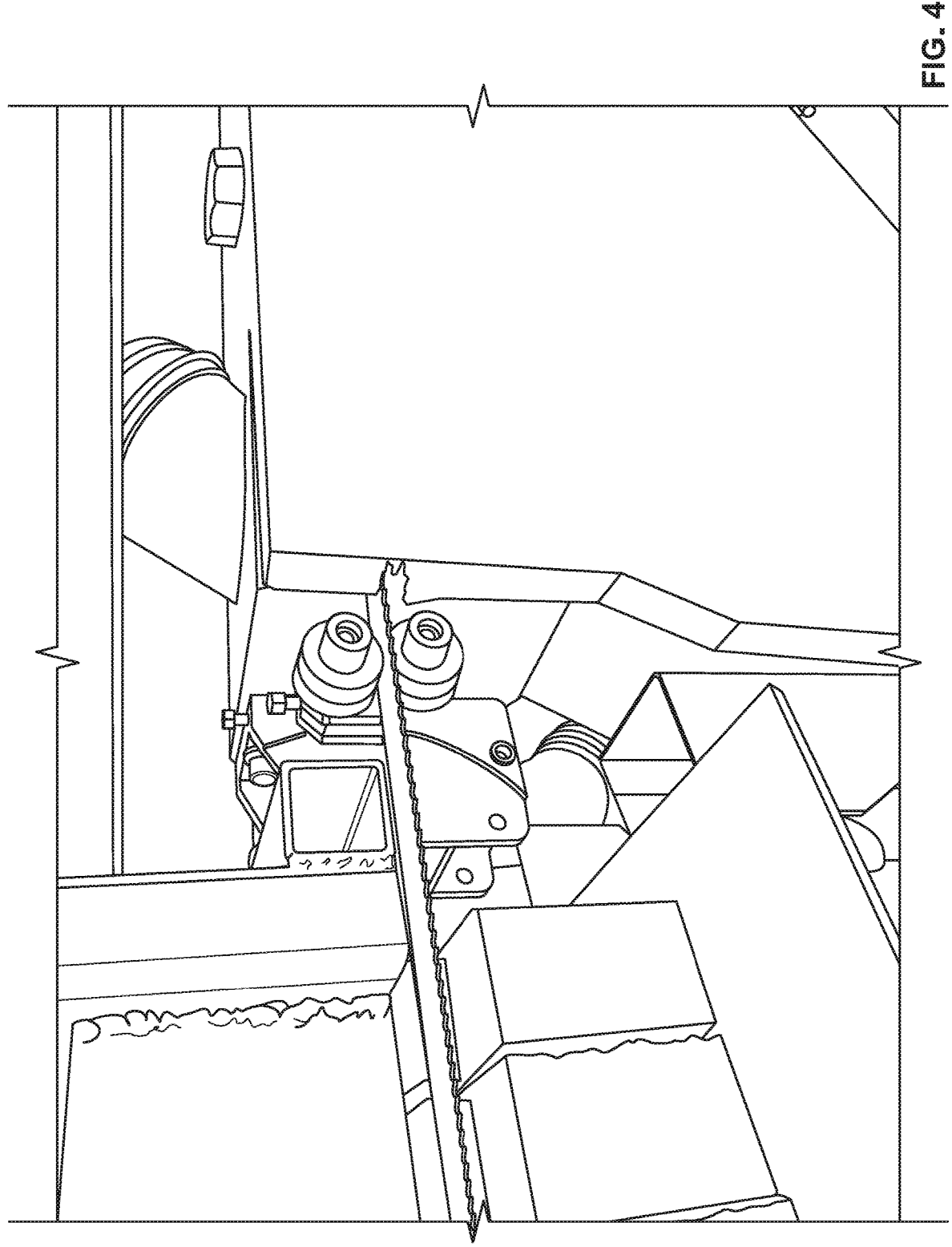

FIG. 4 depicts an exemplary test apparatus, hereinafter referred to as "the RD Test Apparatus," that may be used in conjunction with a blade or a comparative blade to cut at least one foam board. In some embodiments, an amount of residual dust that is generated when cutting the at least one foam board using the RD Test Apparatus may vary depending on whether the blade or the comparative blade is used.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Some embodiments of the present disclosure relate to a blade. In some embodiments, the blade comprises a cutting edge. In some embodiments, the cutting edge comprises a plurality of teeth. In some embodiments, each of the plurality of teeth extends in a first direction from the cutting edge. In some embodiments, the blade comprises a plurality of notches. In some embodiments each of the plurality of notches is recessed in a second direction from the cutting edge. In some embodiments, the second direction is opposite the first direction.

Figure 1:
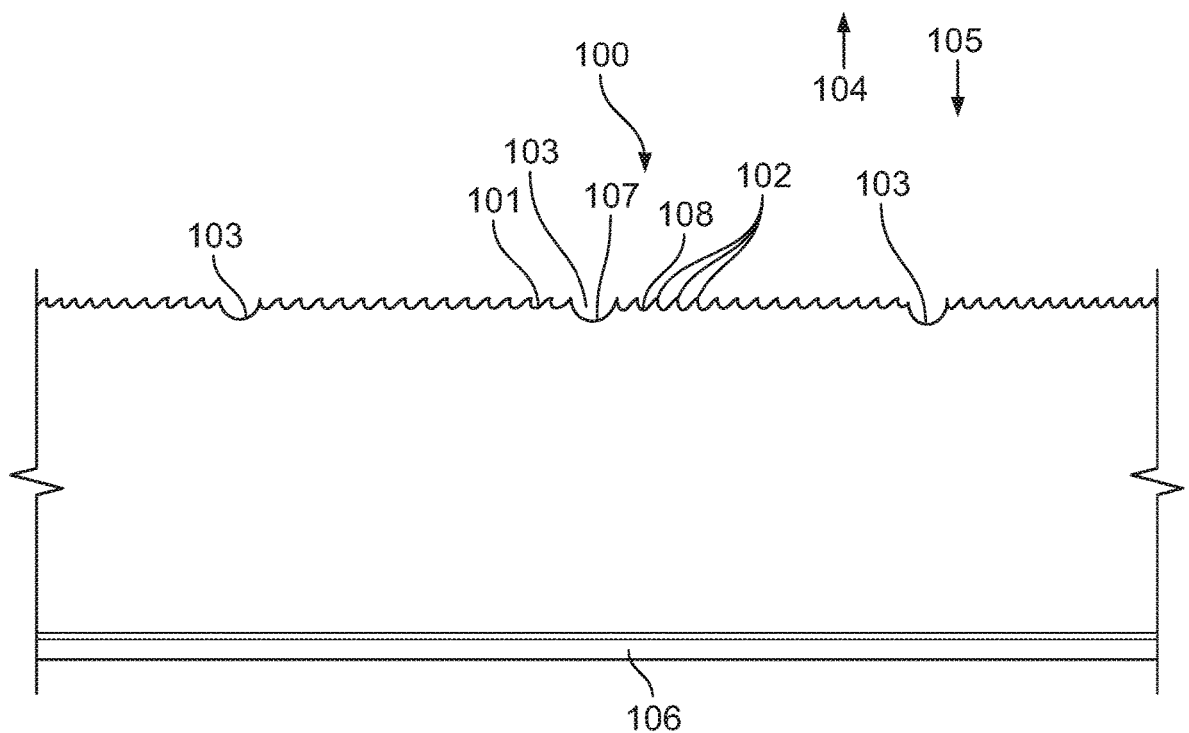
FIG. 1 is a non-limiting example of a blade according to the present disclosure.

A non-limiting example of a blade according to present disclosure is shown in FIG. 1. As shown, exemplary blade 100 may comprise cutting edge 101. In some embodiments, a cutting edge 101 of blade 100 may further comprise a plurality of teeth 102, each of which may extend in first direction 104, from the cutting edge of 101 of the blade 100. In some embodiments, the blade 100 may comprise a plurality of notches 103, each of which may be recessed into the cutting edge 101 of the blade 100 in a second direction 105, which may be opposite first direction 104.

As shown in FIG. 1, in some embodiments, formation of notches 103 in blade 100 with plurality of teeth 102 results in formation of partial teeth. As shown, in some embodiments, partial teeth are formed on both sides of each of notches 103.

While the blade may comprise any suitable material, in some embodiments, the blade comprises at least one metal chosen from steel, brass, iron, zinc, copper, tungsten carbide, or any combination thereof.

In some embodiments, the blade comprises a second cutting edge opposite the first cutting edge. In some embodiments, the blade comprises a second edge, that is not a cutting edge, opposite the first cutting edge. A non-limiting example of a second edge, which may or may not be a cutting edge, is shown in FIG. 1. As shown, second edge 106, which may or may not be a cutting edge, may be present, in some embodiments, on an opposite side of the blade 100 as cutting edge 101.

In some embodiments, at least one of the plurality of notches has a semi-circular profile. In some embodiments, at least some of the plurality of notches have a semi-circular profile. In some embodiments, each notch has a semi-circular profile. A non-limiting example of a blade where each notch has a semi-circular profile is blade 100 of FIG. 1, where each notch 103 has a semi-circular profile.

In some embodiments, at least one, at least some, or each notch has a semi-triangular profile, a semi-square profile, a semi-oval shaped profile, or any other geometric profile.

In some embodiments, the blade comprises a predetermined number of notches evenly spaced apart across a cutting edge of the blade. A non-limiting example of a blade where notches are evenly spaced apart is blade 100 of FIG. 1 where notches 103 are evenly spaced apart on cutting edge 101.

In some embodiments, the blade comprises a predetermined number of notches unevenly spaced apart across a cutting edge of the blade.

In some embodiments, the blade comprises one notch per every quarter inch of the cutting edge of the blade. In some embodiments, the blade comprises two notches per every quarter inch of the cutting edge of the blade. In some embodiments, the blade comprises five notches per every quarter inch of the cutting edge of the blade. In some embodiments, the blade comprises ten notches per every quarter inch of the cutting edge of the blade.

In some embodiments, the blade comprises one to ten notches per every quarter inch of the cutting edge of the blade. In some embodiments, the blade comprises two to ten notches per every quarter inch of the cutting edge of the blade. In some embodiments, the blade comprises five to ten notches per every quarter inch of the cutting edge of the blade.

In some embodiments, the blade comprises one to five notches per every quarter inch of the cutting edge of the blade. In some embodiments, the blade comprises two to five notches per every quarter inch of the cutting edge of the blade.

In some embodiments, the blade comprises two to five notches per every quarter inch of the cutting edge of the blade.

In some embodiments, the blade comprises one notch per every half inch of the cutting edge of the blade. In some embodiments, the blade comprises one notch per every inch of the cutting edge of the blade. In some embodiments, the blade comprises one notch per every two inches of the cutting edge of the blade. In some embodiments, the blade comprises one notch per every five inches of the cutting edge of the blade.

In some embodiments, the blade comprises one to ten notches per every half inch of the cutting edge of the blade. In some embodiments, the blade comprises one to ten notches per every inch of the cutting edge of the blade. In some embodiments, the blade comprises one to ten notches per every two inches of the cutting edge of the blade. In some embodiments, the blade comprises one to ten notches per every five inches of the cutting edge of the blade.

In some embodiments, at least one of the plurality of notches of the blade is recessed at a maximum depth below the cutting edge. In some embodiments, at least some of the plurality of notches of the blade are recessed at a maximum depth below the cutting edge. In some embodiments, each notch of the blade is recessed at a maximum depth below the cutting edge. As used herein, the "maximum depth" is a distance between the lowermost portion of each notch and a longitudinal surface of the cutting edge of the blade. An exemplary maximum depth may be determined using non-limiting blade 100 of FIG. 1 by calculating the distance between lowermost portion 107 of notch 103 and the longitudinal surface 108 (i.e., the surface between each of the plurality of teeth 102) of the cutting edge 101 of blade 100.

In some embodiments, each notch is recessed at a maximum depth of 0.01 inches to 0.2 inches below the longitudinal surface of the cutting edge. In some embodiments, each notch is recessed at a maximum depth of 0.02 inches to 0.2 inches below the longitudinal surface of the cutting edge. In some embodiments, each notch is recessed at a maximum depth of 0.05 inches to 0.2 inches below the longitudinal surface of the cutting edge. In some embodiments, each notch is recessed at a maximum depth of 0.1 inches to 0.2 inches below the longitudinal surface of the cutting edge. In some embodiments, each notch is recessed at a maximum depth of 0.15 inches to 0.2 inches below the longitudinal surface of the cutting edge.

In some embodiments, each notch is recessed at a maximum depth of 0.01 inches to 0.15 inches below the longitudinal surface of the cutting edge. In some embodiments, each notch is recessed at a maximum depth of 0.01 inches to 0.1 inches below the longitudinal surface of the cutting edge. In some embodiments, each notch is recessed at a maximum depth of 0.01 inches to 0.05 inches below the longitudinal surface of the cutting edge. In some embodiments, each notch is recessed at a maximum depth of 0.01 inches to 0.02 inches below the longitudinal surface of the cutting edge.

In some embodiments, each notch is recessed at a maximum depth of 0.02 inches to 0.15 inches below the longitudinal surface of the cutting edge. In some embodiments, each notch is recessed at a maximum depth of 0.05 inches to 0.1 inches below the longitudinal surface of the cutting edge.

In some embodiments, the blade is configured to produce less residual dust when compared to a comparative blade when the blade is used to cut at least one foam board. In some embodiments, the comparative blade is identical to the blade except that the comparative blade does not comprise any notches.

Figure 2:
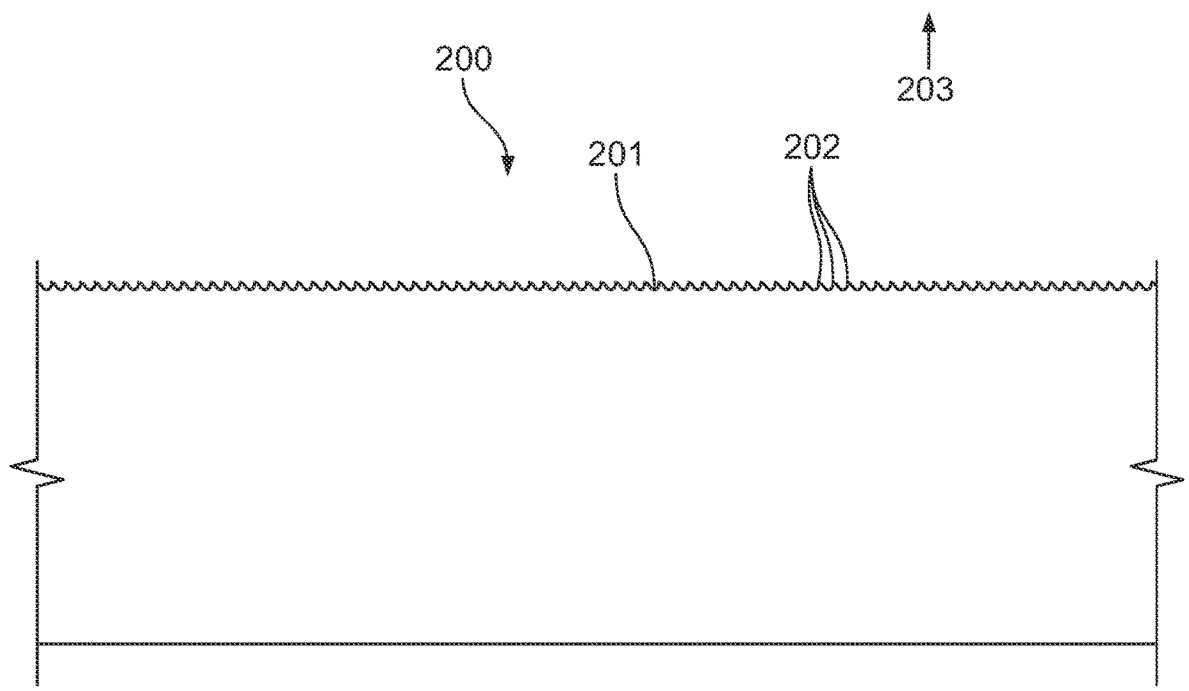
FIG. 2 is a non-limiting example of a comparative blade according to the present disclosure.

A non-limiting example of a comparative blade is shown in FIG. 2. As shown, in some embodiments, the comparative blade 200 is identical to the blade 100 shown in FIG. 1, except that the comparative blade 200 does not comprise any notches. For instance, in some embodiments, the comparative blade 200 may comprise a cutting edge 201. In some embodiments, cutting edge 201 of comparative blade 200 may further comprise a plurality of teeth 202, each of which may extend in first direction 203, from the cutting edge of 201 of the comparative blade 200.

In some embodiments, the blade is configured to produce less residual dust than the comparative blade when the blade is used to cut at least one foam board. As used herein, the term "residual dust" refers to dust that remains on at least one surface of the at least one foam board after the at least one foam board is cut.

In some embodiments, the blade is configured to produce 50% to 99.9% less residual dust than the comparative blade when the blade is used to cut at least one foam board. In some embodiments, the blade is configured to produce 75% to 99.9% less residual dust than a comparative blade when the blade is used to cut at least one foam board. In some embodiments, the blade is configured to produce 90% to 99.9% less residual dust than a comparative blade when the blade is used to cut at least one foam board. In some embodiments, the blade is configured to produce 95% to 99.9% less residual dust than a comparative blade when the blade is used to cut at least one foam board. In some embodiments, the blade is configured to produce 99% to 99.9% less residual dust than a comparative blade when the blade is used to cut at least one foam board. In some embodiments, the blade is configured to produce 99.5% to 99.9% less residual dust than a comparative blade when the blade is used to cut at least one foam board.

In some embodiments, the blade is configured to produce 50% to 99.5% less residual dust than the comparative blade when the blade is used to cut at least one foam board. In some embodiments, the blade is configured to produce 50% to 99% less residual dust than the comparative blade when the blade is used to cut at least one foam board. In some embodiments, the blade is configured to produce 50% to 95% less residual dust than the comparative blade when the blade is used to cut at least one foam board. In some embodiments, the blade is configured to produce 50% to 90% less residual dust than the comparative blade when the blade is used to cut at least one foam board. In some embodiments, the blade is configured to produce 50% to 75% less residual dust than the comparative blade when the blade is used to cut at least one foam board.

In some embodiments, the blade is configured to produce 75% to 99.5% less residual dust than the comparative blade when the blade is used to cut at least one foam board. In some embodiments, the blade is configured to produce 90% to 99% less residual dust than the comparative blade when the blade is used to cut at least one foam board. In some embodiments, the blade is configured to produce 95% less residual dust than the comparative blade when the blade is used to cut at least one foam board.

In some embodiments, the at least one foam board comprises polyisocyanurate (ISO).

In some embodiments, the at least one foam board comprises expanded polystyrene (EPS), extruded polystyrene (XPS), polyurethane foam, melamine foam, or any combination thereof.

In some embodiments, the blade is configured to produce a reduced amount of residual dust, in any range specified herein, as compared to the comparative blade when the blade is used to cut a plurality of foam boards. In some embodiments, the blade is configured to produce a reduced amount of residual dust, in any range specified herein, as compared to the comparative blade when the blade is used to cut at least two foam boards. In some embodiments, the blade is configured to produce a reduced amount of residual dust, in any range specified herein, as compared to the comparative blade when the blade is used to cut at least three foam boards. In some embodiments, the blade is configured to produce a reduced amount of residual dust, in any range specified herein, as compared to the comparative blade when the blade is used to cut at least four foam boards. In some embodiments, the blade is configured to produce a reduced amount of residual dust, in any range specified herein, as compared to the comparative blade when the blade is used to cut at least four five foam boards. In some embodiments, the blade is configured to produce a reduced amount of residual dust, in any range specified herein, as compared to the comparative blade when the blade is used to cut at least ten foam boards. In some embodiments, the blade is configured to produce a reduced amount of residual dust, in any range specified herein, as compared to the comparative blade when the blade is used to cut at least twenty foam boards. In some embodiments, the blade is configured to produce a reduced amount of residual dust, in any range specified herein, as compared to the comparative blade when the blade is used to cut at least fifty foam boards. In some embodiments, the blade is configured to produce a reduced amount of residual dust, in any range specified herein, as compared to the comparative blade when the blade is used to cut at least one-hundred foam boards.

Some embodiments of the present disclosure relate to a method of using a blade described herein. In some embodiments, the method comprises obtaining at least one foam board, and cutting the at least one foam board with the cutting edge of the blade.

In some embodiments, the method comprises cutting a plurality of foam boards with the cutting edge of the blade. In some embodiments, the method comprises cutting at least two foam boards with the cutting edge of the blade. In some embodiments, the method comprises cutting at least five foam boards with the cutting edge of the blade. In some embodiments, the method comprises cutting at least ten foam boards with the cutting edge of the blade. In some embodiments, the method comprises cutting at least twenty foam boards with the cutting edge of the blade. In some embodiments, the method comprises cutting at least fifty foam boards with the cutting edge of the blade. In some embodiments, the method comprises cutting at least one-hundred foam boards with the cutting edge of the blade.

In some embodiments, the method comprises cutting two to one hundred foam boards with the cutting edge of the blade. In some embodiments, the method comprises cutting five to one hundred foam boards with the cutting edge of the blade. In some embodiments, the method comprises cutting ten to one hundred foam boards with the cutting edge of the blade. In some embodiments, the method comprises cutting twenty to one hundred foam boards with the cutting edge of the blade. In some embodiments, the method comprises cutting fifty to one hundred foam boards with the cutting edge of the blade.

In some embodiments, the method comprises cutting two to fifty foam boards with the cutting edge of the blade. In some embodiments, the method comprises cutting two to twenty foam boards with the cutting edge of the blade. In some embodiments, the method comprises cutting two to ten foam boards with the cutting edge of the blade. In some embodiments, the method comprises cutting two to five foam boards with the cutting edge of the blade.

In some embodiments, the method comprises cutting five to fifty foam boards with the cutting edge of the blade. In some embodiments, the method comprises cutting ten to twenty foam boards with the cutting edge of the blade.

In some embodiments, the method produces 50% to 99.9% less residual dust when compared to an otherwise identical method that uses a comparative blade, wherein the comparative blade is identical to the blade except that the comparative blade does not comprise any notches. In some embodiments, the method produces 75% to 99.9% less residual dust when compared to an otherwise identical method that uses a comparative blade, wherein the comparative blade is identical to the blade except that the comparative blade does not comprise any notches. In some embodiments, the method produces 90% to 99.9% less residual dust when compared to an otherwise identical method that uses a comparative blade, wherein the comparative blade is identical to the blade except that the comparative blade does not comprise any notches. In some embodiments, the method produces 95% to 99.9% less residual dust when compared to an otherwise identical method that uses a comparative blade, wherein the comparative blade is identical to the blade except that the comparative blade does not comprise any notches. In some embodiments, the method produces 99% to 99.9% less residual dust when compared to an otherwise identical method that uses a comparative blade, wherein the comparative blade is identical to the blade except that the comparative blade does not comprise any notches. In some embodiments, the method produces 99.5% to 99.9% less residual dust when compared to an otherwise identical method that uses a comparative blade, wherein the comparative blade is identical to the blade except that the comparative blade does not comprise any notches.

In some embodiments, the method produces 50% to 99.5% less residual dust when compared to an otherwise identical method that uses a comparative blade, wherein the comparative blade is identical to the blade except that the comparative blade does not comprise any notches. In some embodiments, the method produces 50% to 99% less residual dust when compared to an otherwise identical method that uses a comparative blade, wherein the comparative blade is identical to the blade except that the comparative blade does not comprise any notches. In some embodiments, the method produces 50% to 95% less residual dust when compared to an otherwise identical method that uses a comparative blade, wherein the comparative blade is identical to the blade except that the comparative blade does not comprise any notches. In some embodiments, the method produces 50% to 90% less residual dust when compared to an otherwise identical method that uses a comparative blade, wherein the comparative blade is identical to the blade except that the comparative blade does not comprise any notches. In some embodiments, the method produces 50% to 75% less residual dust when compared to an otherwise identical method that uses a comparative blade, wherein the comparative blade is identical to the blade except that the comparative blade does not comprise any notches.

In some embodiments, the method produces 75% to 99.5% less residual dust when compared to an otherwise identical method that uses a comparative blade, wherein the comparative blade is identical to the blade except that the comparative blade does not comprise any notches. In some embodiments, the method produces 90% to 99% less residual dust when compared to an otherwise identical method that uses a comparative blade, wherein the comparative blade is identical to the blade except that the comparative blade does not comprise any notches. In some embodiments, the method produces 95% less residual dust when compared to an otherwise identical method that uses a comparative blade, wherein the comparative blade is identical to the blade except that the comparative blade does not comprise any notches.

Some embodiments of the present disclosure relate to a method of manufacturing a blade described herein. In some embodiments, the method comprises obtaining the comparative blade, which as described herein, may be identical to the blade except that the comparative blade does not comprise any notches. In some embodiments, the method comprises forming the blade from the comparative blade. In some embodiments, forming the blade from the comparative blade comprises forming the plurality of notches, described herein, on a cutting edge of the comparative blade. In some embodiments, forming the plurality of notches comprises heat treating the comparative blade and removing material from the cutting edge of the comparative blade. In some embodiments removing material from the cutting edge of the blade is performed with an abrasive saw. In some embodiments, the notches are defined by a recess left over from the removal of the material.

Some embodiments of the present disclosure relate to a system comprising at least one foam board and the blade described herein.

Some embodiments of the present disclosure relate to a system comprising a plurality of foam boards and the blade described herein. Some embodiments of the present disclosure relate to a system comprising at least two foam boards and the blade described herein. Some embodiments of the present disclosure relate to a system comprising at least three foam boards and the blade described herein. Some embodiments of the present disclosure relate to a system comprising at least four foam boards and the blade described herein. Some embodiments of the present disclosure relate to a system comprising at least five foam boards and the blade described herein. Some embodiments of the present disclosure relate to a system comprising at least ten foam boards and the blade described herein. Some embodiments of the present disclosure relate to a system comprising at least twenty foam boards and the blade described herein. Some embodiments of the present disclosure relate to a system comprising at least fifty foam boards and the blade described herein. Some embodiments of the present disclosure relate to a system comprising at least one-hundred foam boards and the blade described herein.

Some embodiments of the present disclosure relate to a system comprising two to one-hundred foam boards and the blade described herein. Some embodiments of the present disclosure relate to a system comprising five to one-hundred foam boards and the blade described herein. Some embodiments of the present disclosure relate to a system comprising twenty to one-hundred foam boards and the blade described herein. Some embodiments of the present disclosure relate to a system comprising fifty to one-hundred foam boards and the blade described herein.

Some embodiments of the present disclosure relate to a system comprising two to fifty foam boards and the blade described herein. Some embodiments of the present disclosure relate to a system comprising two to twenty foam boards and the blade described herein. Some embodiments of the present disclosure relate to a system comprising two to ten foam boards and the blade described herein. Some embodiments of the present disclosure relate to a system comprising two to five foam boards and the blade described herein.

Some embodiments of the present disclosure relate to a system comprising five to fifty foam boards and the blade described herein. Some embodiments of the present disclosure relate to a system comprising ten to twenty foam boards and the blade described herein.

EXAMPLES

Example 1: A non-limiting exemplary blade, as generally shown in FIG. 1 as blade 100, was used to cut a three-foot-long polyisocyanurate (ISO) foam board. The ISO foam board was cut using the RD Test Apparatus shown in FIG. 4 in the cutting direction shown in in FIG. 4.

Figure 3:
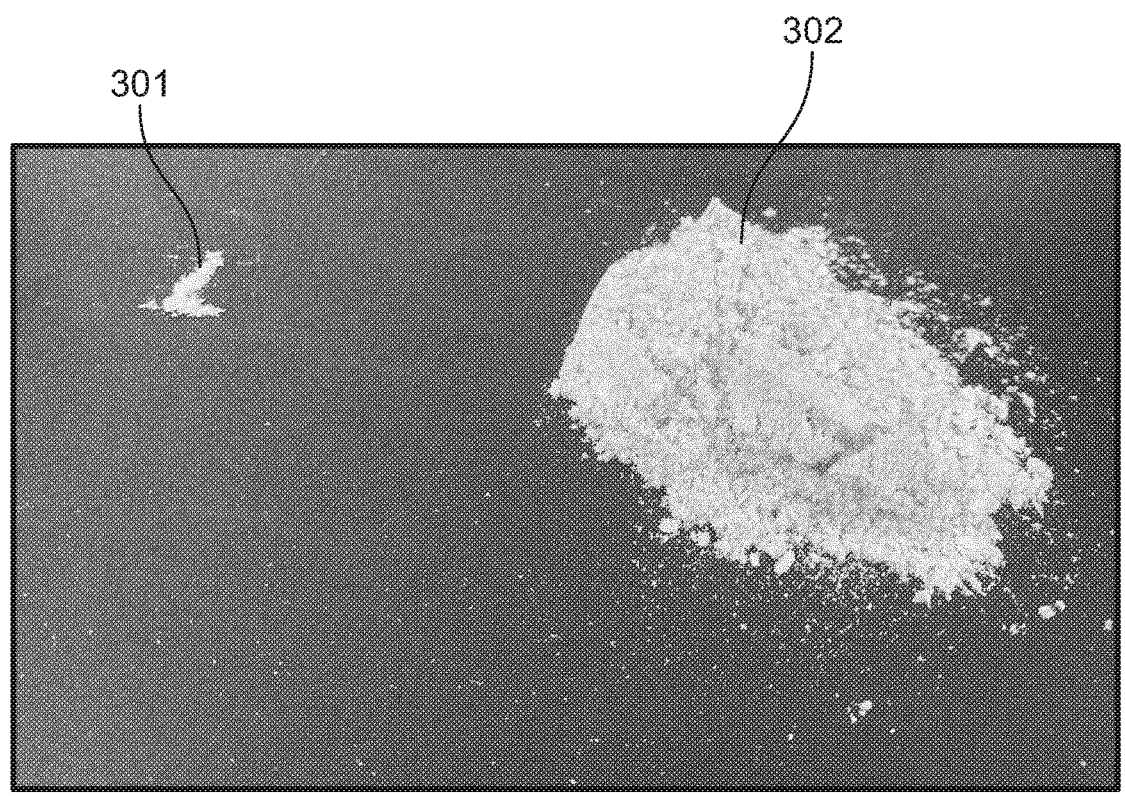
FIG. 3 is an exemplary comparison between an amount of residual dust produced by a blade described herein and an amount of residual dust produced by a comparative blade described herein.

A resulting amount of residual dust 301 after cutting the ISO foam board with the exemplary blade using the RD Test Apparatus is shown in FIG. 3. Specifically, the resulting amount of residual dust 301 remaining on the ISO foam board after cutting with the exemplary blade, was removed from the ISO foam board, measured on a mass balance, and came out to 0.007 grams for the entire three-foot-long-board. In some non-limiting embodiments, non-residual dust (not shown), may be propelled from the exemplary blade into the vacuum ports of the RD Test Apparatus. In some non-limiting embodiments, the vacuum ports may be connected to a dust collector.

Comparative Example 1: A non-limiting comparative blade, as generally shown in FIG. 2 as comparative blade 200, which was identical to the blade of Example 1, except that the comparative blade did not comprise any notches, was used to cut an identical three-foot-long ISO foam board. An identical RD Test Apparatus and cutting direction as Example 1 and FIG. 4 was used to cut the ISO foam board. A resulting amount of residual dust 302 remaining on the ISO foam board after cutting the ISO foam board with the exemplary blade is also shown in FIG. 3. Specifically, the resulting amount of residual dust 302 was removed from the ISO foam board, measured on the same mass balance and came out to 2.059 grams for the entire three-foot-long-board.

Results: An exemplary percentage change from the amount of residual dust produced by the exemplary blade compared to the amount of residual dust produced by the comparative blade of the present disclosure was calculated as follows: $((0.007 \text{ g} - 2.059 \text{ g})/2.059 \text{ g}) \times 100 = $ a 99.66% decrease in residual dust.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

At least some non-limiting aspects of the present disclosure will now be described with reference to the following numbered embodiments hereinafter designated as [E1, E2, E3, E4 . . . ]

E1. A method comprising:
  obtaining a blade comprising:
    a cutting edge, wherein the cutting edge comprises:
      a plurality of teeth, wherein each of the plurality of teeth extends in a first direction from the cutting edge; and
      a plurality of notches, wherein each of the plurality of notches is recessed in a second direction from the cutting edge,
      wherein the second direction is opposite the first direction;
  obtaining at least one foam board; and
  cutting the at least one foam board with the cutting edge of the blade.

E2. The method of E1, wherein, after the cutting step, the method produces 50% to 99.9% less residual dust when compared to an otherwise identical method that uses a comparative blade, wherein the comparative blade is identical to the blade except that the comparative blade does not comprise any notches.

E3. The method of E1 or E2, wherein the blade comprises at least one metal chosen from steel, brass, iron, zinc, copper, tungsten carbide, or any combination thereof.

E4. The method of any of E1 to E3, wherein the blade comprises a second cutting edge opposite the first cutting edge.

E5. The method of any of E1 to E4, wherein the blade comprises one notch per every quarter inch of the cutting edge of the blade.

E6. The method of any of E1 to E5, wherein at least one of the plurality of notches has a semi-circular profile.

E7. The method of any of E1 to E6, wherein at least one of the plurality of notches is recessed at a maximum depth of 0.01 inches to 0.2 inches below the cutting edge.

E8. The method of any of E1 to E7, wherein the at least one foam board comprises polyisocyanurate (ISO).

E9. The method of any of E1 to E7, wherein the at least one foam board comprises expanded polystyrene (EPS), extruded polystyrene (XPS), polyurethane foam, melamine foam, or any combination thereof.

E10. A blade comprising:
a cutting edge, wherein the cutting edge comprises:
a plurality of teeth, wherein each of the plurality of teeth extends in a first direction from the cutting edge; and
a plurality of notches, wherein each of the plurality of notches is recessed in a second direction from the cutting edge,
wherein the second direction is opposite the first direction;
wherein the blade is configured to produce 50% to 99.9% less residual dust than a comparative blade when the blade is used to cut a foam board, wherein the comparative blade is identical to the blade except that the comparative blade does not comprise any notches.

E11. A method of manufacturing a blade comprising:
obtaining a comparative blade,
wherein the comparative blade comprises:
a cutting edge, wherein the cutting edge comprises a plurality of teeth, and wherein each of the plurality of teeth extends in a first direction from the cutting edge; and
wherein the comparative blade is identical to the blade except that the comparative blade does not comprise any notches; and
forming a plurality of notches on the cutting edge of the comparative blade, so as to form the blade, wherein the plurality of notches of the blade is recessed in a second direction from the cutting edge of the blade, wherein the second direction is opposite the first direction.

E12. The method of E11, wherein forming the plurality of notches comprises:
heat treating the comparative blade; and
removing material from the cutting edge of the comparative blade, so as to form the plurality of notches.

E13. A system comprising:
at least one foam board; and
a blade, wherein the blade comprises:
a cutting edge, wherein the cutting edge comprises:
a plurality of teeth, wherein each of the plurality of teeth extends in a first direction from the cutting edge; and
a plurality of notches, wherein each of the plurality of notches is recessed in a second direction from the cutting edge,
wherein the second direction is opposite the first direction;
wherein the blade is configured to produce 50% to 99.9% less residual dust than a comparative blade when the blade is used to cut the at least one foam board, wherein the comparative blade is identical to the blade except that the comparative blade does not comprise any notches.

E14. The system of E13, wherein the system comprises a plurality of foam boards.

The invention claimed is:

1. A method comprising:
obtaining a blade having a major dimension and a minor dimension,
wherein the blade includes a first longitudinal surface extending from a first end of the blade to a second end of the blade along the major dimension, wherein the first longitudinal surface is not a cutting edge;
wherein the blade includes a second longitudinal surface extending from the first end of the blade to the second end of the blade along the major dimension, the second longitudinal surface opposite the first longitudinal surface along the minor dimension;
wherein the first longitudinal surface and the second longitudinal surface are substantially parallel to each other;
the blade comprising:
a first plurality of teeth,
wherein each of the teeth of the first plurality of teeth extends in a first direction from the second longitudinal surface of the blade;
wherein each of the teeth of the first plurality of teeth is the same as the other teeth in the first plurality of teeth;
a second plurality of teeth,
wherein each of the teeth of the second plurality of teeth extends in the first direction from the second longitudinal surface of the blade;
wherein each of the teeth of the second plurality of teeth is the same as the other teeth in the second plurality of teeth and is the same as the other teeth in the first plurality of teeth; and
a plurality of notches including first, second, and third notches,
wherein each of the plurality of notches is recessed in a second direction from the second longitudinal surface of the blade;
wherein each of the plurality of notches have a semi-circular profile;
wherein the second direction is opposite the first direction;
wherein at least one of the plurality of notches is recessed at a maximum depth of 0.05 inches to 0.1 inches below the second longitudinal surface of the blade;
wherein the first plurality of teeth disposed between the first and second notches;
wherein the second plurality of teeth disposed between the second and third notches; and
a plurality of partial teeth including first, second, third, and fourth partial teeth,
wherein the first partial tooth disposed between the first notch and the first plurality of teeth,
wherein the second partial tooth disposed between the first plurality of teeth and the second notch,
wherein the third partial tooth disposed between the second notch and the second plurality of teeth, and
wherein the fourth partial tooth disposed between the second plurality of teeth and the third notch,
obtaining at least one foam board;
cutting the at least one foam board with the first plurality of teeth and the second plurality of teeth,
wherein a cutting direction is a single direction;
wherein the semi-circular profile of each of the plurality of notches is configured to reduce residual foam dust from the at least one foam board during the cutting step; and
capturing the dust with a plurality of vacuum ports connected to a dust collector.

2. The method of claim 1,
wherein the first partial tooth disposed adjacent the first notch,
wherein the second partial tooth disposed adjacent a first side of the second notch,
wherein the third partial tooth disposed adjacent a second side of the second notch, and wherein the fourth partial tooth disposed adjacent the third notch.

3. The method of claim 2, wherein the first, second, third, and fourth partial teeth differ from the teeth in the first and second pluralities of teeth.

4. The method of claim 3, wherein each of the partial teeth results from forming of the plurality of notches in the blade that include the first and second pluralities of teeth.

5. The method of claim 1, wherein the blade comprises at least one metal chosen from steel, brass, iron, zinc, copper, tungsten carbide, or any combination thereof.

6. The method of claim 1, wherein the plurality of notches comprises additional notches present at an interval of one notch per quarter inch of the blade.

7. The method of claim 1, wherein the plurality of notches comprises additional notches present at an interval of one to ten notches per quarter inch of the blade.

8. The method of claim 1, wherein the plurality of notches comprises additional notches present at an interval of two to five notches per quarter inch of the blade.

9. The method of claim 1, wherein the at least one foam board comprises polyisocyanurate (ISO).

10. The method of claim 1, wherein the at least one foam board comprises expanded polystyrene (EPS), extruded polystyrene (XPS), polyurethane foam, melamine foam, or any combination thereof.

* * * * *